Dec. 23, 1958   J. A. KATER ET AL   2,865,083
METHOD OF CLEARING ELECTRICAL CAPACITORS
Filed May 3, 1951
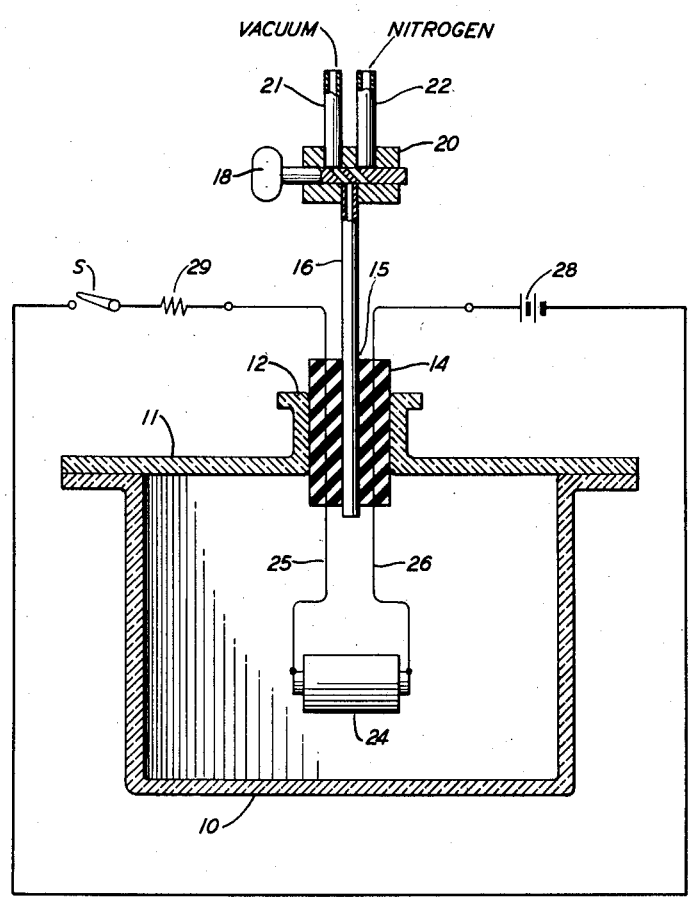
INVENTORS: J. A. KATER
J. R. WEEKS JR.
BY
AGENT

United States Patent Office 2,865,083
Patented Dec. 23, 1958

2,865,083

METHOD OF CLEARING ELECTRICAL CAPACITORS

Joseph A. Kater, Chatham, and John R. Weeks, Jr., South Orange, N. J., assignors to Bell Telephone Laboratories, Incorporated, New York, N. Y., a corporation of New York Application May 3, 1951, Serial No. 224,372

5 Claims. (Cl. 29—25.42)

This invention relates to an improved method of preparing electrical capacitors, particularly useful when the dielectric of the capacitor is polystyrene.

One general object of the invention is to provide an improved method of making electrical capacitors with polystyrene as the dielectric. The method provides in the finished capacitor a tenfold increase in insulation resistance compared with capacitors made with the hitherto customary procedure when metallized electrodes are employed.

An object of the invention, therefore, is the production of metallized polystyrene capacitors of greatly increased insulation resistance.

In polystyrene capacitors, the advantages of high insulation resistance and of low residual charge are realized, but, heretofore, it has been found desirable to use at least two polystyrene layers between electrodes of tin-foil, for example. The present invention makes possible the use of a single sheet of polystyrene between electrodes, such as metallized surfaces on polystyrene sheets, and so permits making a capacitor greatly reduced in size and in quantity of material required. Thus, another object of the invention is to provide a method of making polystyrene capacitors economical in space and material.

The use of metallized paper in making capacitors is well known. Weak points in the paper dielectric result, when voltage is applied, in dielectric failure and an accompanying electrical discharge which melts or vaporizes the metallic coating over an area surrounding the weak points larger than the area of dielectric destroyed. The metal being absent from the periphery of the puncture in the dielectric, the capacitor continues operative and is said to have "self healed." Such punctures occurring during use of the capacitor produce undesirable disturbances in the circuit of which the capacitor is an element, and it is customary to apply to the capacitor before putting it into service a voltage much greater than that which will be applied in normal operating service. For a capacitor intended to sustain in use a potential difference of 150 volts, for example, it is suitable to apply, in air, 450 volts in series with a current-limiting resistance of about 5,000 ohms. This step is known as "clearing" or "burning out" the capacitor. It is described, together with apparatus for registering the punctures, in U. S. Patent 2,522,151, granted September 12, 1950, to J. R. Weeks, Jr.

This treatment is advantageously applied to polystyrene capacitors according to the invention to secure the greatest capacitance stability and the highest insulation resistance.

It has been found that capacitors using polystyrene as the dielectric cleared in air and heat treated in vacuum have an insulation resistance of about 15,000 megohm-microfarads, but, if cleared in a non-oxidizing atmosphere, such as hydrogen or an inert gas like nitrogen, before heat treatment, the insulation resistance after heat treatment in vacuum is about 130,000 megohmmicrofarads at room temperature or 100,000 at 150° F. If the heat treatment following clearing is done in air, the corresponding values are 170,000 and 110,000 megohm-microfarads, respectively.

The apparatus required to practice the method is shown in the single figure of the accompanying drawing.

Referring to the figure, 10 designates a glass jar closed by a glass lid 11 which is removably sealed to the jar by any convenient sealing material. The lid 11 is provided with an open neck 12 through which passes, with suitable air-tight seal, plug 14 of insulating material. Through a central hole 15 in the plug passes glass tube 16 through which the interior of jar 10 may be exhausted or filled with a desired gas by appropriate manipulation of plug 18 in stop cock 20. The connection of tube 16 to a vacuum pump or to a supply of gas is indicated by tubes 21, 22, respectively, in the figure. Within jar 10 capacitor 24, say, of metallized polystyrene, is supported by wires 25, 26 passing through plug 14 and connected to its terminals. Wires 25 and 26 are externally connected in series with 450 volt battery 28 through 5100 ohm resistor 29. It is to be understood that battery 28 symbolizes a source of direct current voltage and may have any desired voltage and that means for measuring the voltage and the current it supplies, though not shown, may be provided. Likewise, other values of resistance of the resistor 29 may be used. Voltage may be applied, interruptedly if desired, to capacitor 24 by means of switch S.

The jar containing capacitor 24 is evacuated of air and then allowed to refill, say, with nitrogen, at atmospheric pressure. The battery voltage is then applied, and sparking at areas of local dielectric weakness occurs. When this ceases, the capacitor is removed from jar 10 and oven heated in air or vacuum by gradually raising the temperature to about 240° F. and then withdrawing the unit from the oven. When the unit is heated in air, there results an insulation resistance at room temperature of the order of 30 percent greater than when the heat treatment is in vacuum.

The capacitor unit may or may not have been impregnated with wax in known manner during the heat treating operation. Unimpregnated units are preferred because such capacitors have a temperature coefficient of capacitance averaging about one-third that of polystyrene capacitors impregnated with mineral wax.

It is believed that when the capacitor is cleared in nitrogen or other non-oxidizing atmosphere, the dielectric performance is degraded less by formation, during clearing, of combustion products which are produced when the surrounding gas is air or other oxidizing gas. It is also believed that when clearing precedes heat treatment any combustion products which may be formed in the clearing process are better able to diffuse from the puncture area. Consequently, the improvement in insulation resistance is obtained.

An extremely compact capacitor of metallized polystyrene sheets is thus produced requiring only about one-quarter of the material needed in the construction of capacitors having two layers of polystyrene sheet between tin-foil electrodes and equal in electrical characteristics to the latter. The ends of the capacitor roll are schooped or sprayed in known fashion with conducting material and terminals are soldered to the metal blocks in the same manner as for metallized paper capacitors to provide connections to the metallic coatings. The average residual charge and Q of such capacitors at room temperature are, respectively, 0.001 percent and 8,000 to 10,000 at a frequency of one kilocycle per second. These are substantially the same as in the conventional foil electrode units of larger size.

The method above described of clearing conductive regions in a capacitor dielectric is applicable to units in which the dielectric is a thermoplastic other than polystyrene, which has been herein chosen for illustration.

What is claimed is:

1. The method of clearing conductive regions in the dielectric of an electrical capacitor including a thermoplastic dielectric film between layers of conducting material which comprises applying a controllable direct-current potential between the layers in a non-oxidizing atmosphere consisting of an elemental gas, said potential being greater than the potential which the capacitor is designed to withstand, and subsequently heat sealing the capacitor.

2. The method of claim 1 in which the atmosphere is an inert gas.

3. The method of claim 2 in which the atmosphere is nitrogen.

4. The method of claim 1 in which the atmosphere is hydrogen.

5. In constructing an electrical capacitor comprising sheets of polystyrene having metallized surfaces as electrodes of the capacitor, the steps of applying between the electrodes in a non-oxidizing atmosphere consisting of an elemental gas a temporary continuous potential greater than the capacitor is designed to withstand continuously and thereafter heat sealing the capacitor.

References Cited in the file of this patent

UNITED STATES PATENTS

| | | |
|---|---|---|
| 1,307,341 | Brinton | June 24, 1919 |
| 1,341,336 | Macpherson | May 25, 1920 |
| 1,536,944 | Steenstrup | May 5, 1925 |
| 1,594,124 | Shrader | July 27, 1926 |
| 2,095,807 | Gier | Oct. 12, 1937 |
| 2,171,127 | Kohman | Aug. 29, 1939 |
| 2,181,695 | Given | Nov. 28, 1939 |
| 2,387,759 | Jarvis | Oct. 30, 1945 |
| 2,395,442 | Ballard | Feb. 26, 1946 |
| 2,438,721 | Spencer | Mar. 30, 1948 |

FOREIGN PATENTS

| | | |
|---|---|---|
| 246,115 | Switzerland | Nov. 17, 1947 |